(12) United States Patent
Hingne et al.

(10) Patent No.: US 12,286,161 B2
(45) Date of Patent: Apr. 29, 2025

(54) CAB MOUNTING SYSTEM AND CAB MOUNTING

(71) Applicant: DEERE & COMPANY, Moline, IL (US)

(72) Inventors: Abhijit Hingne, Khamgaon (IN); Thiemo Flebbe, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 376 days.

(21) Appl. No.: 18/046,379

(22) Filed: Oct. 13, 2022

(65) Prior Publication Data

US 2023/0242191 A1 Aug. 3, 2023

(30) Foreign Application Priority Data

Jan. 31, 2022 (DE) .......................... 102022102178.5
Jan. 31, 2022 (DE) .......................... 102022102179.3
Jan. 31, 2022 (DE) .......................... 102022102180.7

(51) Int. Cl.
| | | |
|---|---|---|
| *B62D 27/06* | (2006.01) | |
| *B62D 33/06* | (2006.01) | |
| *B62D 33/067* | (2006.01) | |
| *B62D 33/07* | (2006.01) | |
| *B62D 33/077* | (2006.01) | |

(52) U.S. Cl.
CPC .............. *B62D 27/06* (2013.01); *B62D 33/06* (2013.01); *B62D 33/067* (2013.01); *B62D 33/071* (2013.01); *B62D 33/077* (2013.01)

(58) Field of Classification Search
CPC ...... B62D 27/06; B62D 33/06; B62D 33/063; B62D 33/067; B62D 33/0608; B62D 33/0604; B62D 33/071; B62D 33/077
See application file for complete search history.

(56) References Cited

U.S. PATENT DOCUMENTS

| | | |
|---|---|---|
| 10,494,039 B2 | 12/2019 | Young et al. |
| 10,549,796 B2 | 2/2020 | Helm et al. |
| 10,717,475 B2 | 7/2020 | Manternach et al. |

(Continued)

FOREIGN PATENT DOCUMENTS

| | | |
|---|---|---|
| DE | 19961670 A1 | 8/2000 |
| EP | 2650195 A2 | 10/2013 |

OTHER PUBLICATIONS

CN 204567810 U with English translation (Year: 2015).*

(Continued)

*Primary Examiner* — Lori Lyjak

(57) ABSTRACT

A cab mounting including a chassis holder, a cab holder, and a shaping element. The chassis holder includes a chassis plate, designed for fastening to a vehicle chassis, and a lower bearing plate, which is fastened to the chassis plate and has an opening designed for connection to an upper bearing plate. The cab holder includes a cab plate, designed for fastening to a vehicle cab, and an upper bearing plate, which is fastened to the cab plate and has a U-shaped structure, designed in order to be held movably in the opening of the lower bearing plate, such that the chassis holder and the cab holder are movable relative to each other. The shaping element is attached to at least one of the lower bearing plate and the chassis plate such that dirt which occurs is scraped off at the shaping element.

12 Claims, 4 Drawing Sheets

(56) References Cited

U.S. PATENT DOCUMENTS

| | | |
|---|---|---|
| 10,793,204 B2 | 10/2020 | Manternach et al. |
| 11,203,383 B2 | 12/2021 | Manternach et al. |
| 2018/0178746 A1* | 6/2018 | Scott .......................... B60R 3/02 |

OTHER PUBLICATIONS

European Search Report issued in application No. 22197816.6, dated Jun. 15, 2023, 6 pages.
European Search Report application No. 22197815.8, dated Jun. 15, 2023, 8 pages.
European Search Report application No. 22197813.3, dated Jun. 15, 2023, 9 pages.
Extended European Search Report and Written Opinion issued in European Patent Application No. 22197813.3 dated Jun. 15, 2023, in 18 pages.
Extended European Search Report and Written Opinion issued in European Patent Application No. 22197815.8 dated Jun. 15, 2023, in 16 pages.
Extended European Search Report and Written Opinion issued in European Patent Application No. 22197816.6 dated Jun. 15, 2023, in 13 pages.

* cited by examiner

CAB MOUNTING SYSTEM AND CAB MOUNTING

CROSS-REFERENCE TO RELATED APPLICATIONS

This application claims priority to German Patent Application No. 102022102178.5, filed Jan. 31, 2022, German Patent Application No. 102022102179.3, filed Jan. 31, 2022, and German Patent Application No. 102022102180.7, filed Jan. 31, 2022, which are hereby incorporated by reference.

FIELD OF THE DISCLOSURE

The present disclosure relates to a cab mounting system and to a cab mounting for vehicles, which make it possible for the cab of a vehicle to be fastened on or at the chassis.

BACKGROUND

Agricultural and construction vehicles include an operator cab connected to the chassis of the vehicle.

SUMMARY

Vehicles, especially for the off-road sector, are used in demanding working environments. The vehicles may be construction vehicles, for example crawler vehicles, vehicles for excavation, or forestry vehicles for processing timber or agricultural vehicles.

The location of use is generally undeveloped terrain with slopes. Specifically, if there is a gradient and when used on soil or boulders, a pronounced inclination of the vehicle may occur, with an associated tipping or overturning of the vehicle in the event of an accident. In this situation, the operator should be protected as best as possible from injuries, firstly against possible collisions inside the cab, and secondly against being thrown out of the cab. In addition, the cab has to be held on the vehicle in such a manner that the cab is prevented from breaking loose in the event of tipping of the vehicle, and a safety cell for the operator is maintained even if the vehicle overturns.

Due to the use of the vehicle in open terrain and the associated working environment, an ingress of dirt on and in the vehicle is not prevented. Soiling thus occurs below the vehicle cab, and therefore the spring deflection may be impaired, particularly in the case of movably mounted cabs. In addition, the ingress of dirt may lead to noise being produced since gaps present between movable components of the cab mounting may be filled with dirt particles.

It is the object of the disclosure to avoid the problems discussed. The object is achieved by the disclosure according to one or more of the following embodiments. Further developments of the disclosure emerge from the following embodiments.

The disclosure relates to a cab mounting, having a chassis holder, having a chassis plate, designed for fastening to a vehicle chassis, a lower bearing plate, which is fastened to the chassis plate and has an opening, designed for connection to an upper bearing plate, a cab holder, having a cab plate, designed for fastening to a vehicle cab, an upper bearing plate, which is fastened to the cab plate and has a U-shaped structure, designed in order to be held movably in the opening of the lower bearing plate such that the chassis holder and the cab holder are movable relative to each other, wherein a shaping element is attached to the lower bearing plate and/or to the chassis plate such that dirt which occurs is scraped off at the shaping element.

The shaping element provides a surface which is reduced in size, particularly in the region of the lower bearing plate. The lower bearing plate is conventionally welded or screwed to the chassis plate such that a 90 degree angle or an acute angle is formed between the two. An increased accumulation of dirt occurs specifically at this transition and the adjoining surface region of the chassis plate and lower bearing plate. The shaping element reduces the size of this surface, and the angular region between the two plates is covered by the shaping element. The building up of dirt is therefore prevented and the cabin mounting function can be implemented with a reduced outlay on maintenance.

In one embodiment, the shaping element can be composed of metal or plastic.

If manufactured from plastic, a higher degree of flexibility or deformability of the shaping element is ensured. The shaping element can be fastened here to the chassis holder by means of adhesive bonding, screwing, wedging, clamping, or plastics welding. If manufactured from metal, the shaping element can have increased durability or a longer service life. In this case, the shaping element can be attached to the chassis holder by welding.

In one embodiment, the shaping element can be provided on one side of the lower bearing plate.

In the installed state, the lower bearing plate is oriented vertically such that the side surfaces face in a horizontal direction. The shaping element can bear against one side surface. This can advantageously be provided on the side which has an intense accumulation of dirt during operation of the vehicle and can be oriented in an outer direction of the vehicle or in a direction of travel.

In one embodiment, the shaping element can be provided on both sides of the lower bearing plate.

The arrangement on both sides ensures that the building up a layer of dirt is comprehensively avoided. All driving situations can be covered by this and the cab mounting function is more broadly protected.

In one embodiment, a hydraulic actuator can be provided between the cab plate and the chassis plate.

The actuator ensures that the mounting of the cab can be actively activated. Thus, movements detected by a vehicle sensor system can be used to reduce the effects on the cab. Furthermore, the actuator ensures that damping can take place.

In one embodiment, a position sensor can be provided on the lower bearing plate, the position sensor interacting with a linkage for guiding the upper bearing plate and lower bearing plate.

By means of the position sensor which interacts with the linkage, which constitutes a bearing between the lower and the upper bearing plate, the vertical distance between the upper and the lower bearing plate can be detected. The position sensor can be an angle sensor or a distance sensor as long as a distance can be calculated from the measurement data. Using the calculated distance, an active suspension of the cab can be realized. This actively activates hydraulic actuators which are present, and therefore an adjustment is undertaken. Furthermore, a safety-relevant state can be detected, and therefore even in this case the hydraulic actuators can be actively driven into a separate position which ensures the greatest possible safety for the operator.

The disclosure furthermore relates to a cab mounting system having at least two of the cab mountings indicated above, wherein a Panhard rod is held movably between the cab plate of a cab mounting and the lower bearing plate of the further cab mounting.

The above and other features will become apparent from the following detailed description and accompanying drawings.

BRIEF DESCRIPTION OF THE DRAWINGS

The disclosure and embodiments will be explained with reference to the figures, in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
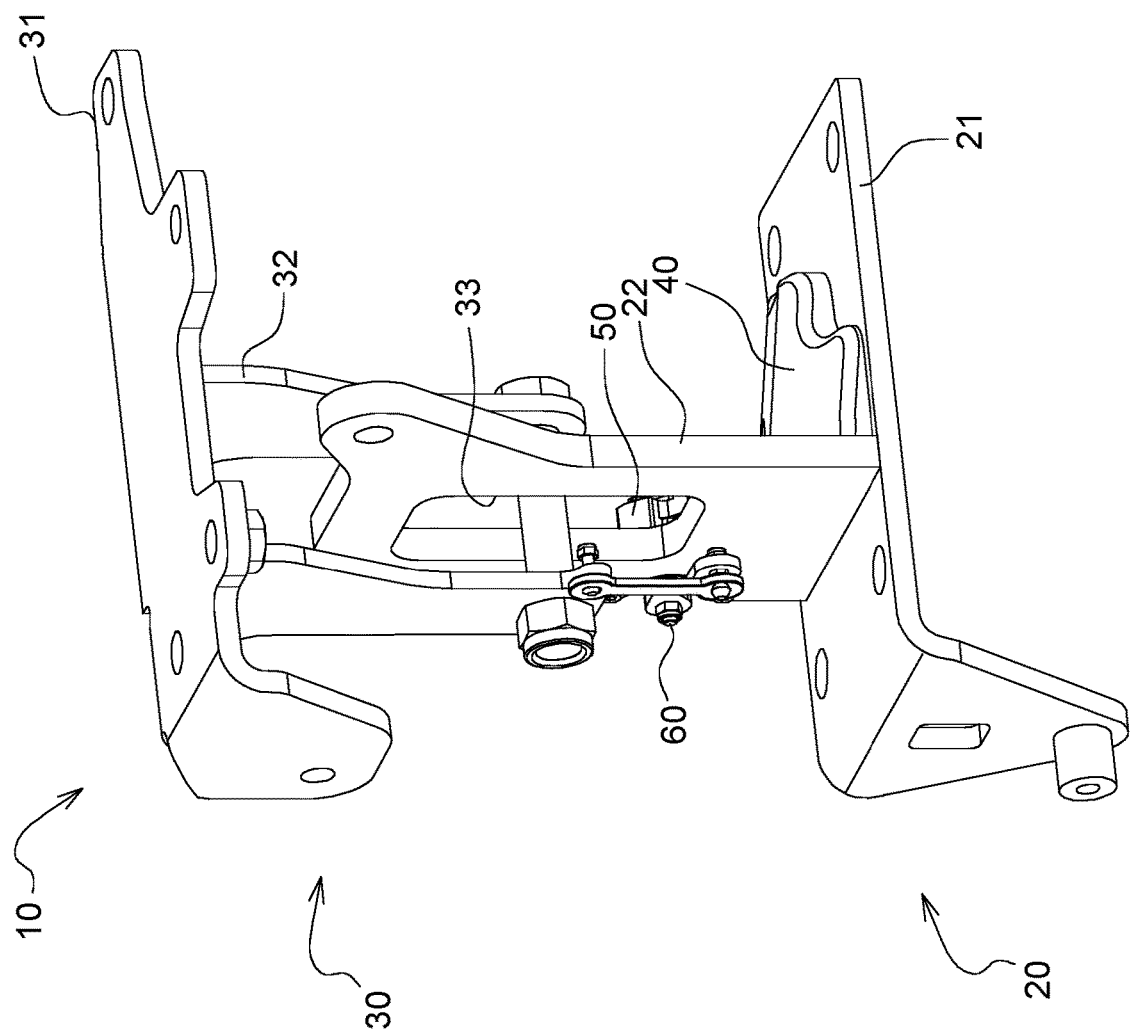
FIG. 1 shows a detailed view of an embodiment.

FIG. 1 illustrates the cab mounting 10 in an isometric view. The cab mounting 10 is in a two-part form. The lower part is the chassis holder 20, the upper part the cab holder 30. The chassis holder 20 includes a chassis plate 21 which is provided to be fastened to a part of the vehicle, for example a component part of the chassis, by means of screwing or welding. A lower bearing plate 22 is connected fixedly to the chassis plate 21 in such a manner that said lower bearing plate extends predominantly perpendicularly to the chassis plate 21 and is attached in a central region of the chassis plate 21. The connection can be ensured by means of welding, screwing, riveting. The center of the lower bearing plate 22 has an opening 33 or recess which serves to receive part of the upper bearing plate 32. The opening 33 can be milled, bored, or punched.

The cab holder 30 has a cab plate 31 which is designed to be attached to a component part of the cab. For this purpose, the cab plate 31 can have bores for screws, but it can alternatively also be welded. On the cab plate 31, an upper bearing plate 32 is fixedly connected predominantly perpendicularly in a central region of the cab plate 31. For this purpose, the upper bearing plate 32 has two mutually parallel webs which are fastened at a fixed distance to the cab plate 31 and have two free ends. In an end region of the upper bearing plate 32, the free ends are connected to one another by a bolt, a screw, or a metal rod. The bolt sits at the same time inside the opening 33 of the lower bearing plate 22 and ensures a movable connection of the lower bearing plate 22 to the upper bearing plate 32, and therefore also of the chassis holder 20 to the cab holder 30. The relative moveability of the cab holder 30 and of the chassis holder 20 is defined by the geometrical height and width of the opening 33.

A shaping element 40 is attached at a transition of the lower bearing plate 22 and the chassis plate 21. The shaping element 40 can be fastened here to both plates simultaneously, or only to one of the two. The shaping element 40 can be made from plastic or metal. It can be fastened in one or both plates by means of a snap mechanism or can be screwed or welded. The shaping element 40 has a shape sloping toward a free end of the chassis plate 21. In the installed position on the vehicle, the sloping shape points in the direction of gravity. The configuration has the effect that dirt which arises is conducted away from the lower bearing plate 22 by the action of gravity, and dirt does not accumulate on the latter. As a result, dirt particles can be prevented from accumulating and the moveability of lower bearing plate 22 and upper bearing plate 32 is ensured. The shaping element 40 can enclose an angle of 10 to 80 degrees with respect to the horizontal plane in the installed position. Together with the action of water, for example because of rain or because of active cleaning of the vehicle, the removal of dirt particles at the transition point can furthermore be simplified, as a result of which the outlay on maintenance is reduced.

The chassis holder 20 and the cab holder 30 are additionally connected movably to each other by the linkage 60. The linkage 60 serves primarily to detect the distance of the chassis holder 20 and the cab holder 30 from each other. For this purpose, a position sensor 50 in the form of an angle sensor which detects the angle of the deflection of the linkage 60 is attached to the lower bearing plate 22. By means of an electrical signal output from the sensor 50 together with a possible calculation using a control device (e.g., a controller including a processor and memory), the distance can be calculated or measured directly. The distance can be used for controlling an active damping of the cab.

Figure 2:
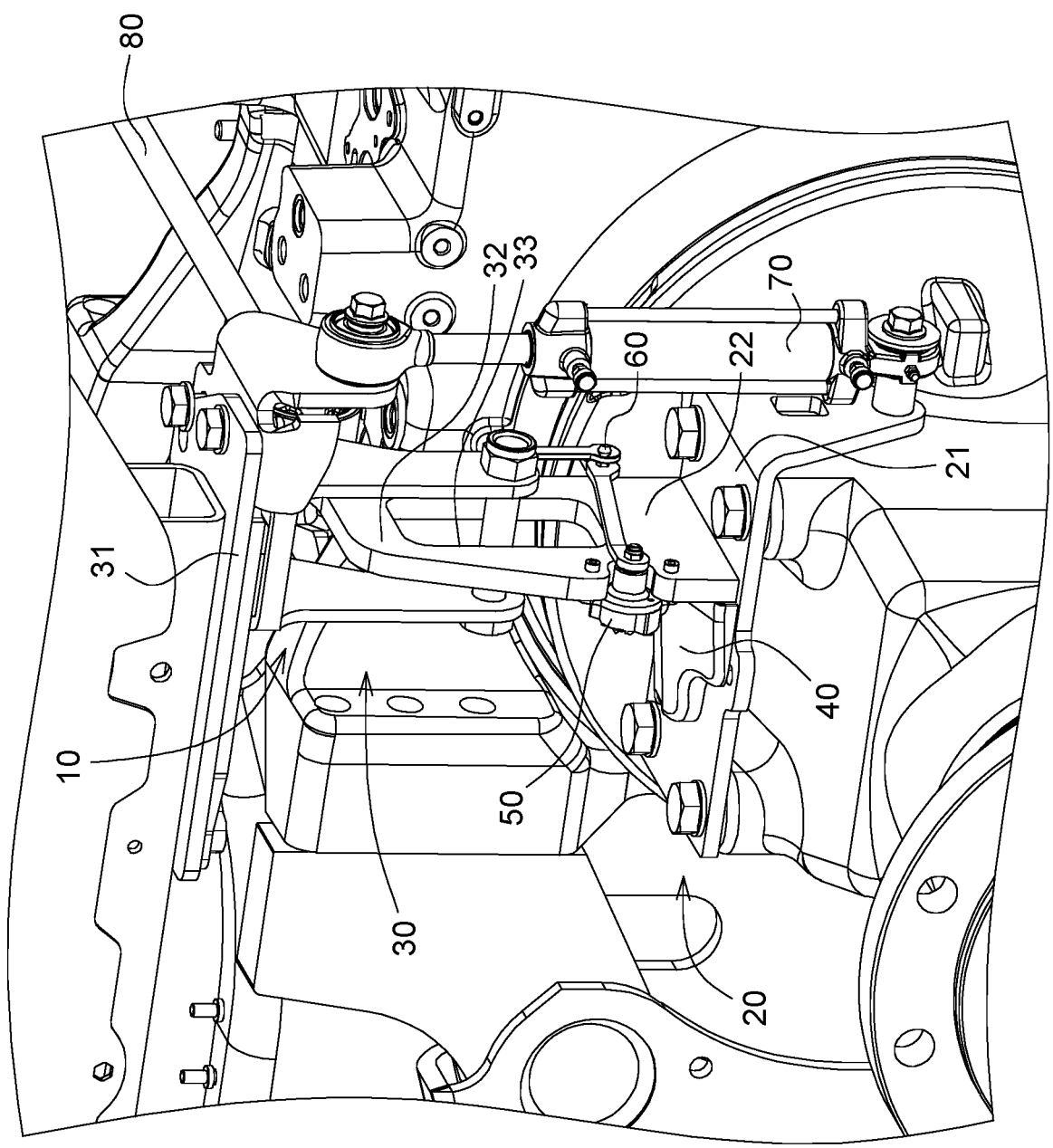
FIG. 2 shows an embodiment in an installed state in a vehicle.

FIG. 2 shows the cab mounting 10 in an installed position in the vehicle. The cab mounting 10 is attached to a chassis region of the vehicle by the chassis holder 20 and the chassis plate 21. This can be undertaken by means of screwing, riveting, welding or the like. The cab mounting 10 is fastened to a lower side of the cab by the cab holder 30 and the cab plate 31. The connection can likewise be produced by screwing, riveting, or welding. A hydraulic actuator 70 is attached to one side of the cab mounting 10. Said hydraulic actuator is used for actively adjusting the cab mounting 10 such that the distance between the cab holder 30 and the chassis holder 20 can be adjusted, or active damping of the cab is made possible. The hydraulic actuator is fastened to the chassis holder 20 and to the cab holder 30.

During use, the cab moves differently with respect to the vehicle chassis. This movement results in a relative movement of the upper bearing plate 32 and lower bearing plate 22. By means of the linkage 60 and the position sensor 50, the movement of the bearing plates can be detected and the hydraulic actuator 70 actively activated therefrom.

The two bearing plates are connected to each other by a web which is attached between the two ends of the upper bearing plate 32. It is likewise possible for only the lower bearing plate 22 to have two free ends. In the event of a vehicle overturning or of a powerful action of force on the cab, the bearing plates maintain the connection of the cab to the vehicle such that rolling over or detaching is prevented.

Figure 3:
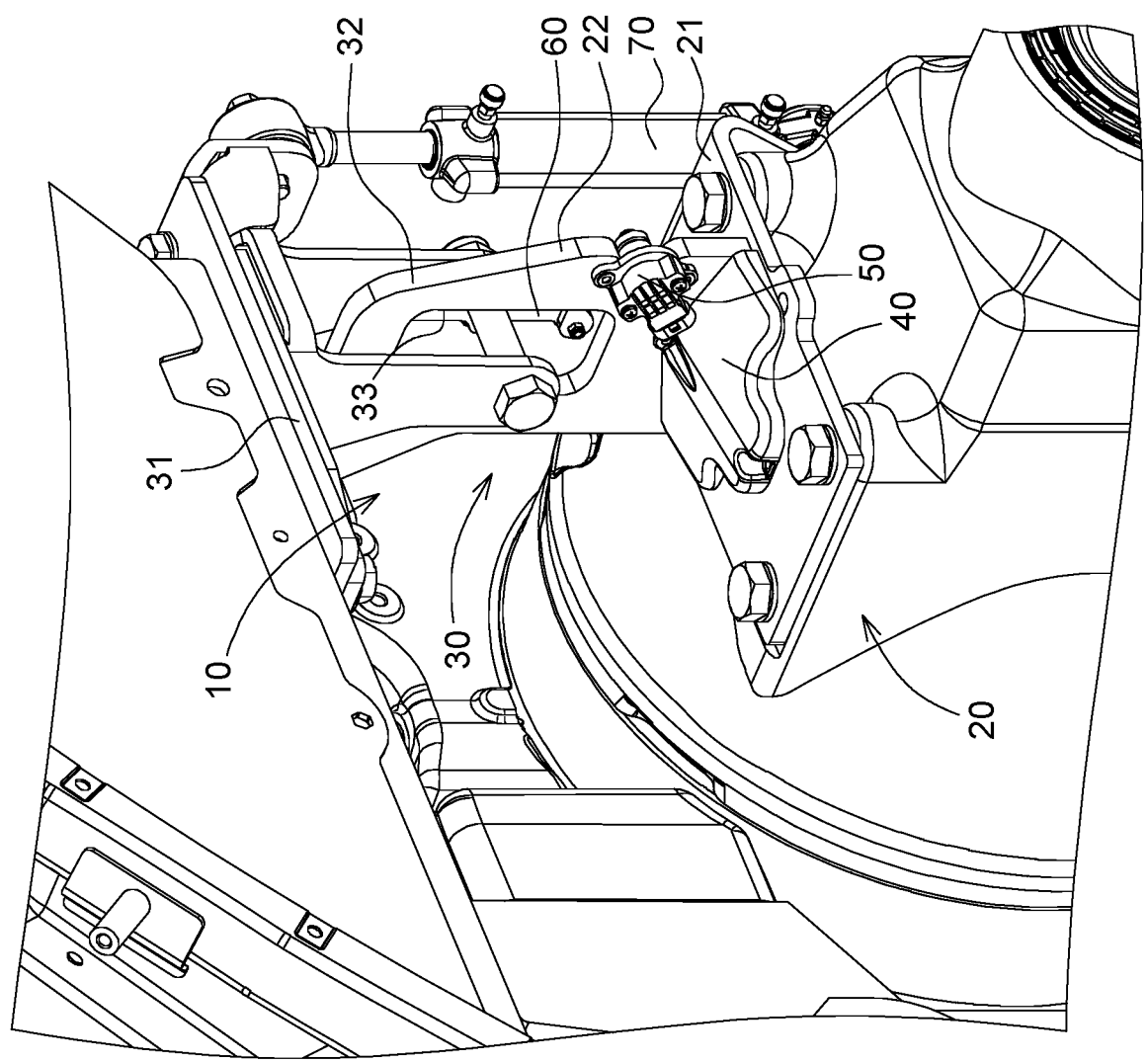
FIG. 3 shows another embodiment in an installed state.

FIG. 3 shows a further view of the cab mounting 10. The shaping element 40 is attached visibly on one side of the lower bearing plate 22. The height of the shaping element 40 can be set variably, as a result of which the angle between the upper side of the shaping element 40 and the horizontal in the installed position can change. The shaping element 40 is fastened to the chassis plate 21 by a screw connection and to the lower bearing plate 22 by a further screw connection. The connection may also be undertaken by means of a snap mechanism. If the shaping element 40 is composed of metal, a welded connection can also be provided.

The position sensor 50, which is attached to the lower bearing plate 22, is connected to a controller, which is not shown here. By means of the controller, the movement behavior of the cab can be detected and calculated such that the hydraulic actuator 70 can be actively activated. The sensor 50 can be attached to the lower bearing plate 22. If the installation situation permits, the sensor can also be provided on the upper bearing plate 32. The sensor 50 can also be a linear position sensor. Alternatively, the hydraulic actuator 70 can have a positional measurement, and therefore an additional position sensor 50 can be omitted.

Figure 4:
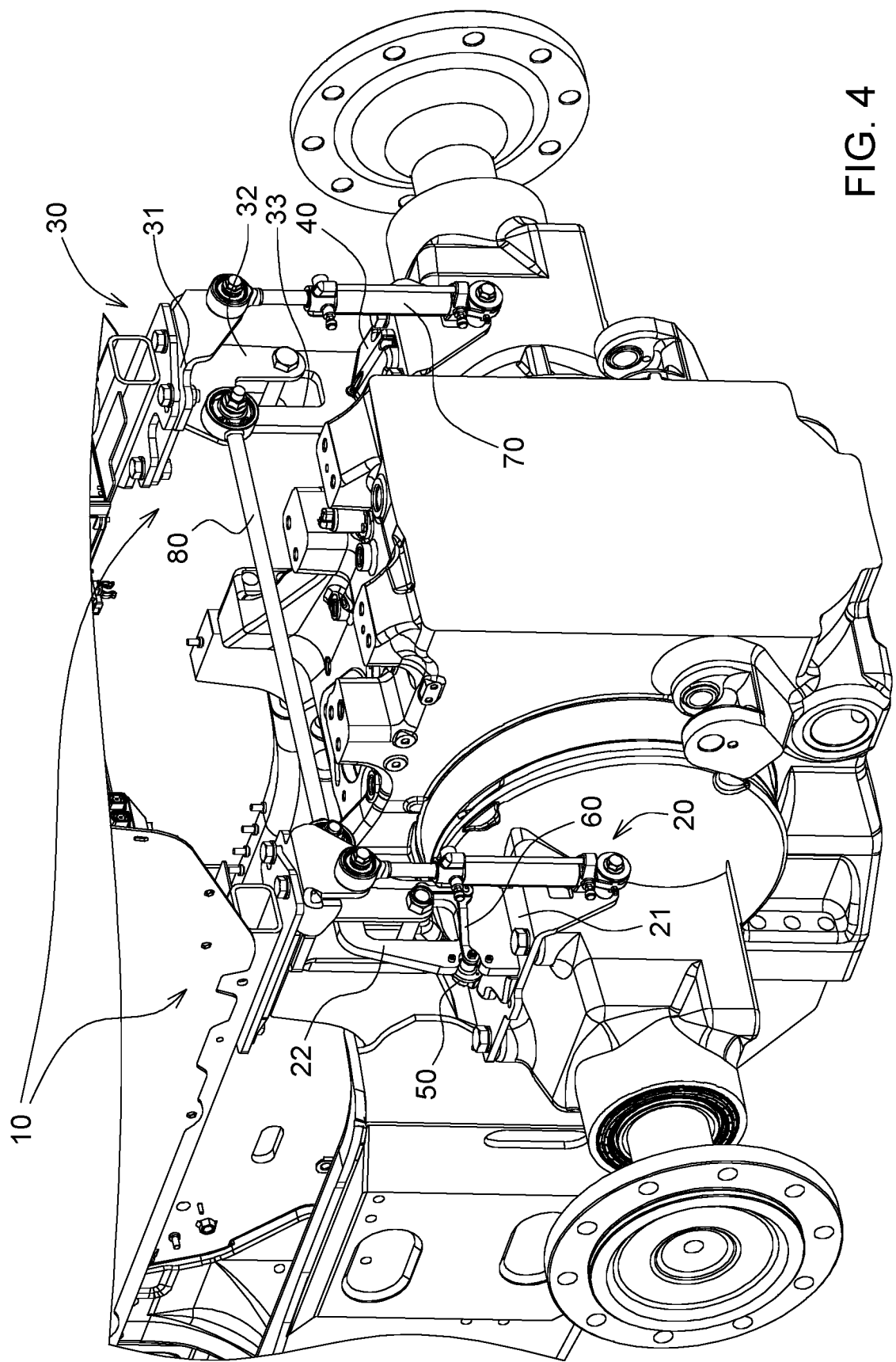
FIG. 4 shows an embodiment on an axle module of a vehicle.

FIG. 4 shows the cab mounting 10 which is fastened to a section of the axle housing of a vehicle. In addition to the embodiments described previously, the cab mounting 10 has a Panhard rod 80 which connects an assembly of the cab mounting 10 to a further assembly on the other side of the cab. The Panhard rod 80 ensures the limitation of the degrees of freedom and prevents the cab structure, which is fastened to the cab plate 31, from deviating laterally. By this means, the cab mounting 10 according to the disclosure can be integrated as a cab mounting system in a vehicle. The system is adaptable to any cab dimensions and permits use within a wide vehicle sector for different working tasks.

The cab mounting system can have at least one position sensor 50 on one cab mounting side, but attaching the position sensor 50 on both sides is also possible, and therefore an unequal height on either side of the cab mounting 10 can be identified.

Particularly in the region of the axles of vehicles, a great ingress and building up of dirt takes place. Due to the cab mounting 10 of the present disclosure, the building up of dirt in the critical region of the mutually movable components is prevented. The cab mounting 10 and the cab mounting system according to the present disclosure ensure satisfactory functioning, by preventing buildup of dirt, jamming of the movable parts, and any resulting annoying noises.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A cab mounting, comprising:
   a chassis holder including a chassis plate, designed for fastening to a vehicle chassis, and a lower bearing plate, which is fastened to the chassis plate and has an opening designed for connection to an upper bearing plate;
   a cab holder including a cab plate, designed for fastening to a vehicle cab, and the upper bearing plate, which is fastened to the cab plate and has a U-shaped structure, designed in order to be held movably in the opening of the lower bearing plate, such that the chassis holder and the cab holder are movable relative to each other; and
   a shaping element attached to at least one of the lower bearing plate and the chassis plate such that dirt which occurs is scraped off at the shaping element.

2. The cab mounting of claim 1, wherein the shaping element is composed of one of metal and plastic.

3. The cab mounting of claim 1, wherein the shaping element is provided on one side of the lower bearing plate.

4. The cab mounting of claim 1, wherein the shaping element is provided on both sides of the lower bearing plate.

5. The cab mounting of claim 1, further comprising:
   a hydraulic actuator between the cab plate and the chassis plate.

6. The cab mounting of claim 1, further comprising:
   a position sensor on the lower bearing plate, the position sensor interacting with a linkage for guiding the upper bearing plate and lower bearing plate.

7. A cab mounting system, comprising:
   a first cab mounting and a second cab mounting; and
   a panhard rod;
   wherein each of the first cab mounting and the second cab mounting comprises:
      a chassis holder including a chassis plate, designed for fastening to a vehicle chassis, and a lower bearing plate, which is fastened to the chassis plate and has an opening designed for connection to an upper bearing plate;
      a cab holder including a cab plate, designed for fastening to a vehicle cab, and the upper bearing plate, which is fastened to the cab plate and has a U-shaped structure, designed in order to be held movably in the opening of the lower bearing plate, such that the chassis holder and the cab holder are movable relative to each other; and
      a shaping element attached to at least one of the lower bearing plate and the chassis plate such that dirt which occurs is scraped off at the shaping element; and
   wherein the panhard rod is movably held between the cab plate of the first cab mounting and the lower bearing plate of the second cab mounting.

8. The cab mounting system of claim 7, wherein the shaping element is composed of one of metal and plastic.

9. The cab mounting system of claim 7, wherein the shaping element is provided on one side of the lower bearing plate.

10. The cab mounting system of claim 7, wherein the shaping element is provided on both sides of the lower bearing plate.

11. The cab mounting system of claim 7, further comprising:
   a hydraulic actuator between the cab plate and the chassis plate.

12. The cab mounting system of claim 7, further comprising:
   a position sensor on the lower bearing plate, the position sensor interacting with a linkage for guiding the upper bearing plate and lower bearing plate.

* * * * *